(12) United States Patent
Doudoumopolous

(10) Patent No.: US 7,015,795 B2
(45) Date of Patent: Mar. 21, 2006

(54) SELF-IDENTIFYING INTEGRATED CIRCUITS AND METHOD FOR FABRICATION THEREOF

(75) Inventor: Nicholas Doudoumopolous, Garrett Park, MD (US)

(73) Assignee: Potomac Photonics, Inc., Lanham, MD (US)

( * ) Notice: Subject to any disclaimer, the term of this patent is extended or adjusted under 35 U.S.C. 154(b) by 536 days.

(21) Appl. No.: 10/330,228

(22) Filed: Dec. 30, 2002

(65) Prior Publication Data

US 2004/0124437 A1 Jul. 1, 2004

(51) Int. Cl.
*H04Q 5/22* (2006.01)
*H04Q 9/00* (2006.01)
*H01L 31/109* (2006.01)
*G11C 11/34* (2006.01)
*H02J 7/00* (2006.01)

(52) U.S. Cl. .................... 340/10.42; 251/200; 340/5.8; 365/185; 320/106; 346/140

(58) Field of Classification Search ................ 257/200; 340/10.42, 5.8; 365/185; 320/106; 346/140
See application file for complete search history.

(56) References Cited

U.S. PATENT DOCUMENTS

| 4,872,027 | A | | 10/1989 | Buskirk et al. |
| 5,675,825 | A | * | 10/1997 | Dreyer et al. .................. 712/42 |
| 5,790,834 | A | * | 8/1998 | Dreyer et al. .................. 703/22 |
| 5,958,037 | A | * | 9/1999 | Dreyer et al. .................. 712/32 |
| 6,246,210 | B1 | | 6/2001 | Kuan et al. |
| 6,325,483 | B1 | | 12/2001 | Harbour et al. |
| 6,377,484 | B1 | | 4/2002 | Shau |
| 6,704,872 | B1 | * | 3/2004 | Okada ......................... 713/194 |
| 6,815,739 | B1 | * | 11/2004 | Huff et al. .................... 257/275 |

* cited by examiner

*Primary Examiner*—Michael Horabik
*Assistant Examiner*—Scott Au
(74) *Attorney, Agent, or Firm*—Rosenberg, Klein & Lee

(57) ABSTRACT

A self-identifying integrated circuit contains a primary function circuit and an immutable, unique identification code, which is presented at an output port thereof upon demand by, an external circuit. The unique identification code may be an N bit digital number or may be a response signal to an interrogating excitation signal. The circuitry to store the unique identification code is fabricated on a microscopic scale such as by a direct-write laser forward transfer of material process or by a laser ablation of select material process. The identification storage means may be disposed on a package substrate or on an integrated circuit die and is permanently encased within the integrated circuit package so as to be protected from alteration by external means.

20 Claims, 9 Drawing Sheets

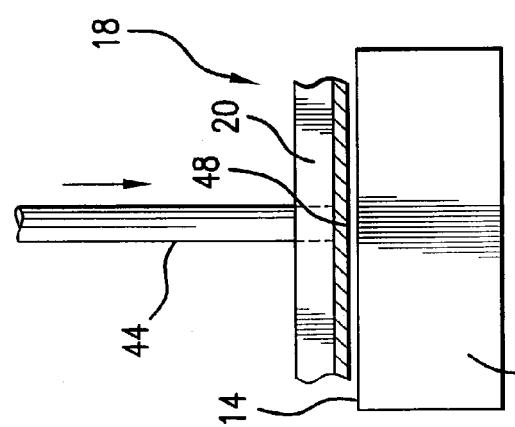
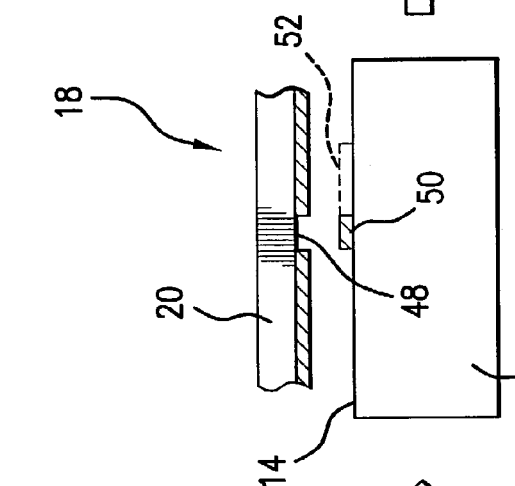
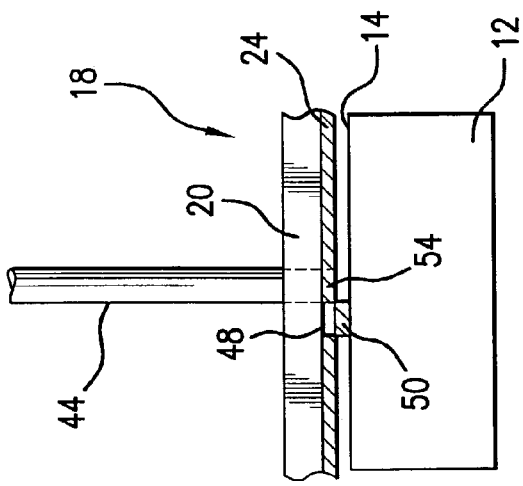
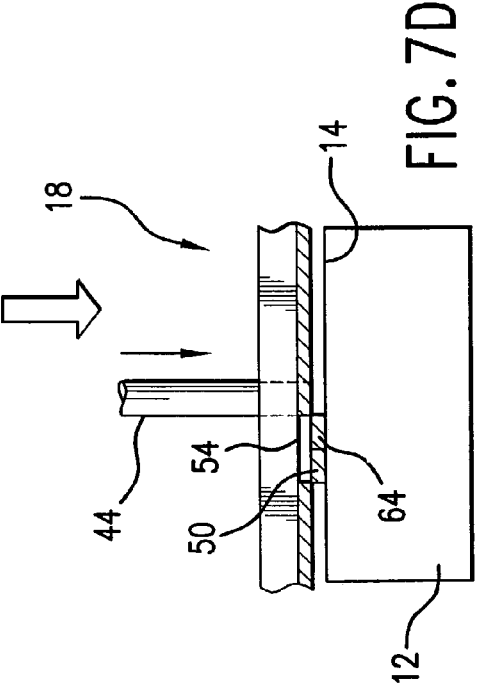

SELF-IDENTIFYING INTEGRATED CIRCUITS AND METHOD FOR FABRICATION THEREOF

FIELD OF THE INVENTION

This invention generally relates to integrated circuits, each capable of providing a unique identification code to an external circuit upon request. More specifically, this invention relates to self-identifying integrated circuits which have the capability of providing the unique identification code to an external circuit, but which also perform a predetermined function in an external electric circuit, where the predetermined function of the integrated circuit is not that of providing the unique identification code.

BACKGROUND OF THE INVENTION

Modern telecommunication systems, whether such systems are wireless or hard-wired, may be simultaneously accessed by multiple users having first been granted access. A key element in acquiring such access is that the user's equipment must have a valid identification code or number associated therewith. Using a cellular telephone network as an example, each individual cell phone is provided with a unique electronic serial number (ESN) which is "unalterable" and is installed in the cellular phone handset. In the past, the ESN has been programmed into an erasable programmable read only memory (EPROM), however, current Federal Communications Commission (FCC) rules specify that the ESN may not be stored in re-programmable memory or in any socketed device. Beyond that restriction, however, there is no requirement to prevent the field modification of an ESN.

In many cases, an ESN, acquired through unscrupulous or illicit methods, may be "cloned" into one or more cell phones. The cloned cell phones are then used fraudulently, the billable use of which is then charged to the legitimate owner of the ESN.

Storing an ESN in an unalterable memory does not provide security from fraudulent access to the cellular network. In some cases, the ESN memory may be removed, such as by desoldering, from the circuitboard of the handset, leaving the cell phone otherwise operable. The circuitboard terminals formerly occupied by the ESN memory chip may then be electrically coupled to an external circuit capable of providing counterfeit ESN(s). This type of fraudulent cell phone use may be avoided if the cellular phone circuit were rendered inoperative when the ESN memory is removed.

According to the FCC, the cellular industry estimates that carriers lose more than $150 million per year to cellular fraud. Thus, there is a clear need for providing a unique identification code (such as an ESN) to an external circuit (such as a cell phone) wherein the removal of the identification code providing means renders the external circuit inoperative.

SUMMARY OF THE INVENTION

An object of the present invention is to provide a self-identifying integrated circuit for performing a predetermined electrical function in an external electric circuit, means for immutably storing a unique identification code, and output means for conveying the unique identification code to the external circuit.

In one embodiment of the present invention, the self-identifying integrated circuit includes a voltage tap network, wherein the unique identification code is stored as a set of discrete voltage levels. In a preferred embodiment of the invention, the voltage tap network is fabricated on a package substrate by direct-write laser forward transfer of material or by laser ablation of select material.

In another embodiment of the present invention, the unique identification code exists as a predetermined response signal to an externally applied interrogation signal. The identification storage means may be a resonant electric circuit, a time-constant circuit, or a resistive circuit providing the predetermined response signal upon excitation. In a preferred embodiment of the invention, the circuit components are fabricated on a package substrate by direct-write laser forward transfer of material or by laser ablation of select material.

A further object of the present invention is to provide a method of fabrication for self-identifying integrated circuits. In a preferred embodiment of the method, a unique identification code is deposited on a package substrate by direct-write forward transfer of material or by laser ablation of select material on a pre-patterned substrate, the substrate with the immutable identification storage is coupled to an electric circuit disposed on a semiconductor wafer die, the electric circuit is coupled to a plurality of package electrodes, and the electric circuit die and identification storage means are encased such that the plurality of electrodes protrudes through at least one surface thereof.

BRIEF DESCRIPTION OF THE DRAWINGS

The objects defined above as well as further advantages of the present invention are best understood by referring to the following Detailed Description in conjunction with the accompanying Drawings, in which:

FIGS. 7A, 7B, 7C, and 7D illustrate the principal method steps of the direct-write forward transfer of material technique as used by the present invention;

DETAILED DESCRIPTION OF THE PREFERRED EMBODIMENTS

Figure 1:
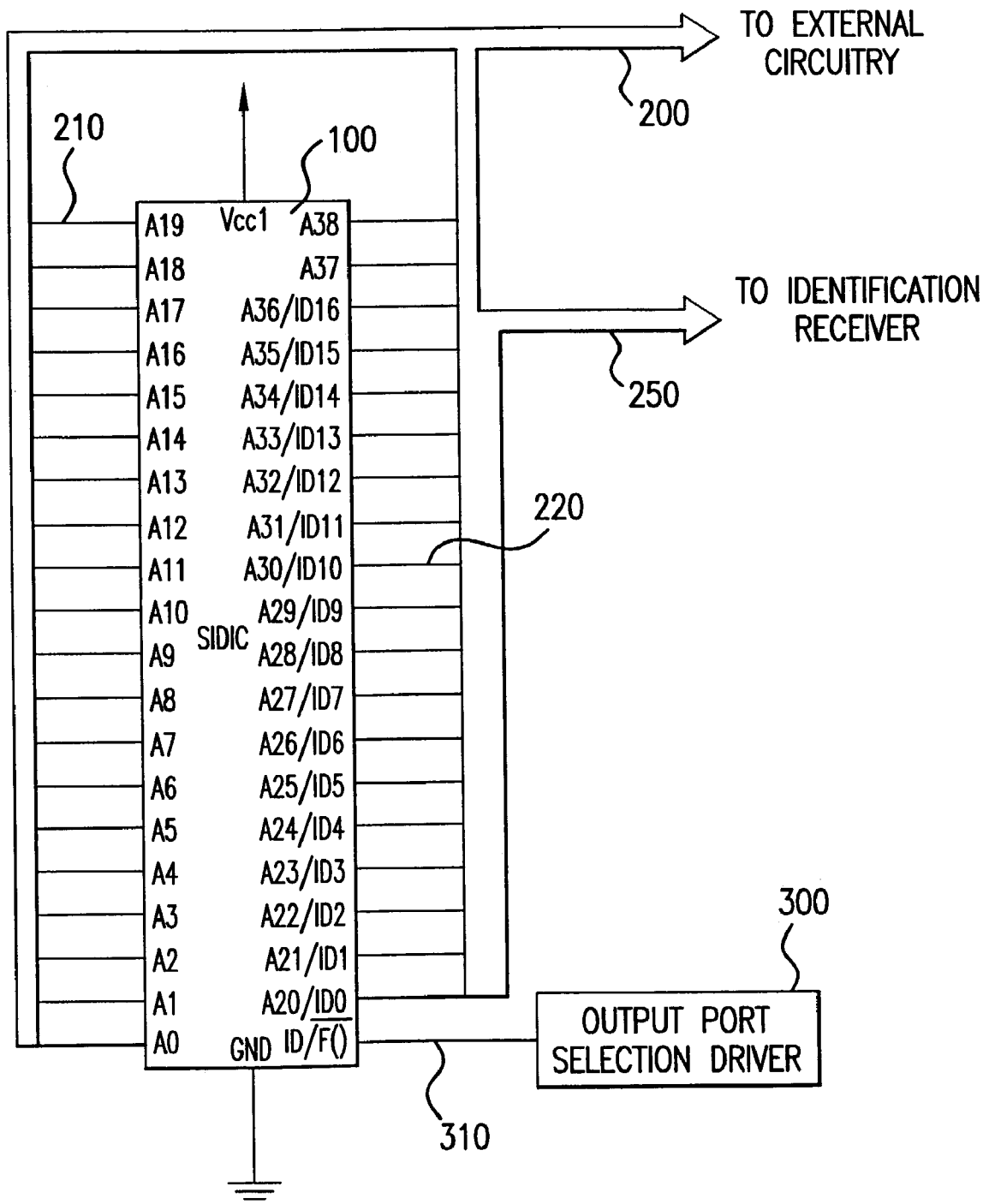
FIG. 1 is a block diagram illustrating a preferred embodiment of the invention in communication with an external circuit.

Referring to FIG. 1, the self-identifying integrated circuit (SIDIC) 100 is shown in an exemplary circuit configuration. SIDIC 100 performs a primary function in an extended circuit and, additionally, provides a unique identification code assigned to SIDIC 100 upon request by an external circuit. Thus, SIDIC 100 is coupled to the external circuitry comprising the remainder of the extended circuit through bus 200 and is coupled to an identification receiver through bus 250. The identification receiver can be any external circuit capable of sensing the identification code as presented by SIDIC 100. As will be discussed in further paragraphs, the identification receiver may include an interrogation means for providing an excitation signal and receiving the identification code as a response thereto.

SIDIC 100 is electrically coupled to surrounding circuitry through a plurality of terminals or pins. In a preferred embodiment, three types of terminals, classified by functionality, are disposed on SIDIC 100. The first type, single function terminal 210, is assigned to the primary function of the integrated circuit and conducts a corresponding functional aspect of the primary function circuit therethrough. The second terminal type, dual function pin 220, is not only assigned to the primary function circuit to perform a corresponding functional aspect therethrough, but is also coupled to identification storage means. Thus, when the identification code of SIDIC 100 is required, primary function operations can be suspended and the identification code may be presented on a set of dual function terminals 220. The set of terminals when an identification code or an identification signature is presented is referred to herein as an output port. With reference to FIG. 1, dual function terminals 220 embody an output port whose terminals or pins are shared with the primary function circuit. The sharing of pins between the primary function circuit and the identification storage means provides a compact packaging configuration, but other configurations are possible while remaining within the scope of the present invention. For example, an entirely separate set of pins on SIDIC 100 may be used to provide the identification code, thus providing the primary function circuit its own dedicated terminals.

The third terminal type of the embodiment of the present invention illustrated in FIG. 1 is provided to select the function of the output port when terminals thereof have the shared function previously described. Output port selection terminal 310 is electrically coupled to an output port selection driver 300, which is an external circuit for selecting the output configuration of the output port. In the exemplary embodiment of FIG. 1, a logic level "low" at terminal 310 configures the output port to act in a default primary function mode for performing the predetermined electrical function in the extended circuit. A "high" logic level at terminal 310 configures the output port to provide at the pins thereof the unique ID of SIDIC 100.

The output port selection feature of SIDIC 100 is not necessary to use the present invention. Obviously, an output port selection circuit is unnecessary if the primary function circuit of SIDIC 100 and the identification storage means do not share pins. Moreover, as will be discussed in paragraphs that follow, when the identification code is a response signal to an applied excitation voltage or signal, primary function circuit and identification storage means may share pins without the need for an output port function selection feature.

Figure 2:
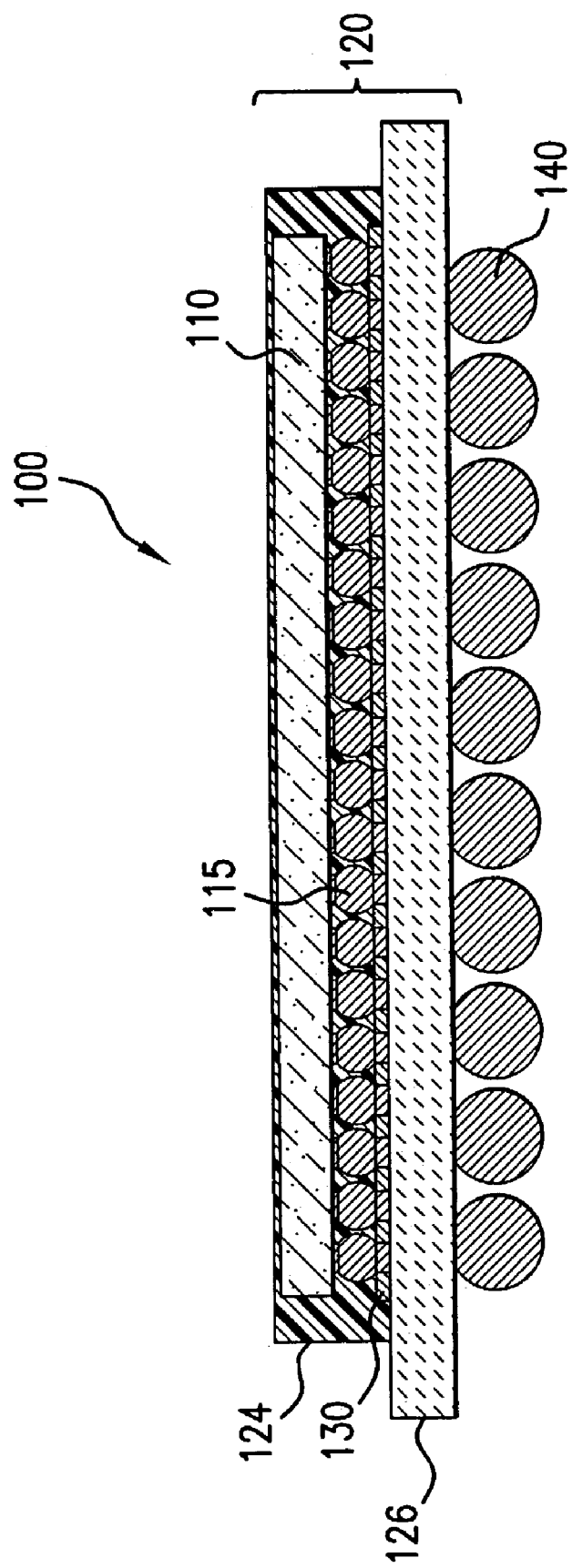
FIG. 2 is a cross-sectional diagram illustrating structural details of a preferred embodiment of the present invention.

FIG. 2 illustrates an exemplary physical construction of SIDIC 100. The illustration of FIG. 2 represents a so-called "flip chip" packaging configuration well-known in the integrated circuit art. In the flip chip configuration, an integrated circuit die 110 is contained within an encasement means 120 and is electrically coupled to external circuitry through conductive terminals in the form of solder balls 140. Encasement means 120 is generally composed of a package substrate 126 and an encapsulant 124. Integrated circuit die 110 is electrically coupled to package substrate 126, and therethrough to solder balls 140, by a plurality of solder bumps 115.

In a preferred embodiment of the present invention, package substrate 126 has disposed thereon identification storage means 130 which is electrically coupled to integrated circuit die 110 and, simultaneously, electrically coupled to a plurality of solder balls 140. With the deposition of identification storage means 130 on package substrate 126 by appropriate means, such as by those discussed in following paragraphs, each integrated circuit package may receive a unique, immutable identification code independent of the type of integrated circuit contained therein. This would allow, for example, a particular vendor to provide its customers with "preprinted" package substrates in a variety of standard package configurations. The package substrate vendor's customers, e.g., chip manufacturers, may then attach their integrated circuit dies to the package substrate as they normally would.

Figure 3:
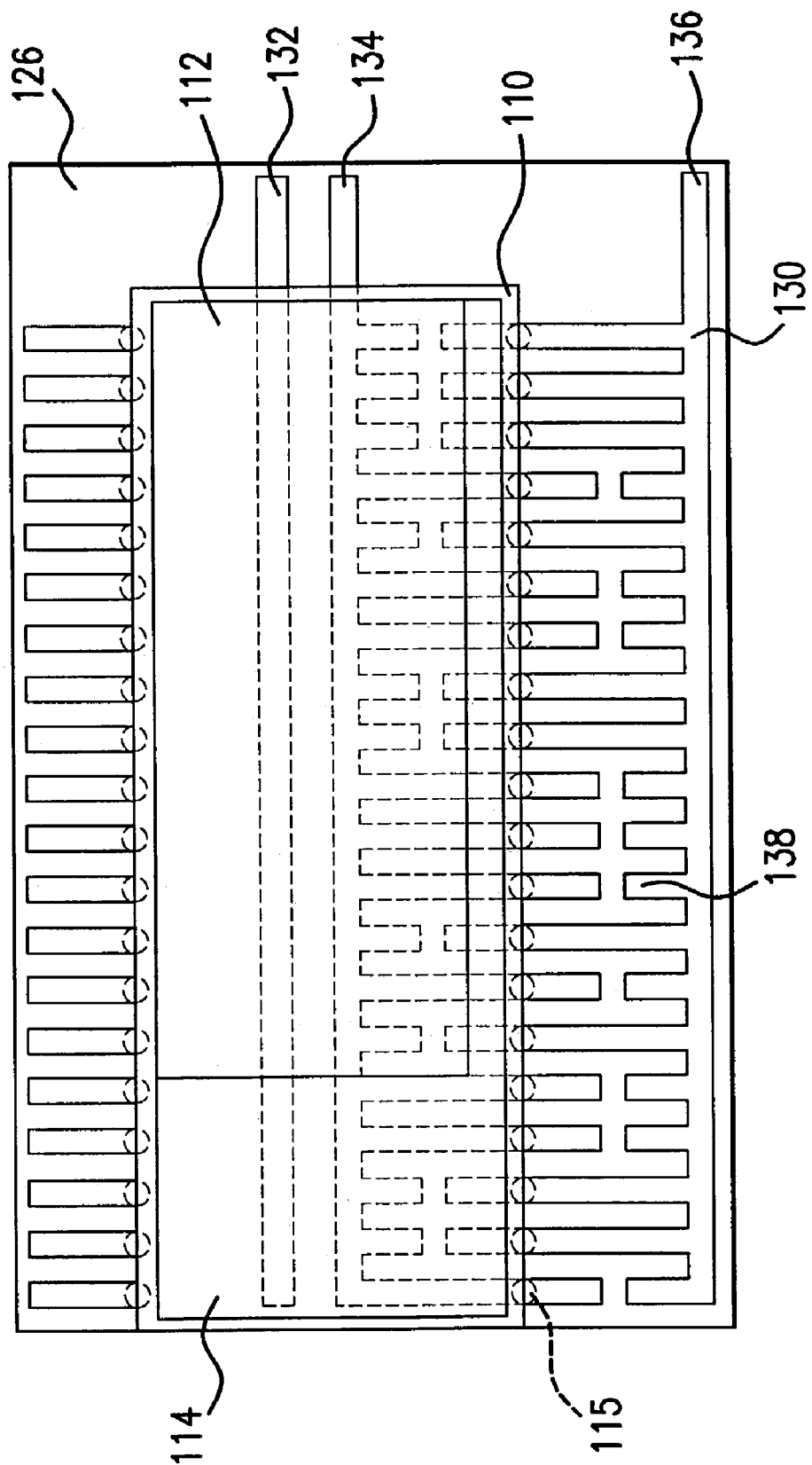
FIG. 3 is an illustration of a physical layout of elements comprising the present invention.

Referring to FIG. 3, a broad side view of the upper surface of package substrate 126 is shown revealing a physical configuration of SIDIC 100. On the surface of package substrate 126, identification storage means 130 is disposed in the form of a voltage tap network. Identification storage means 130 is electrically coupled to a first voltage bus 134 (e.g., 3.3V) and a second voltage bus 136 (0V or ground reference voltage) through respective package terminals. Identification storage means 130 further includes a plurality of conductor segments 138 having formed therein a gap in a predetermined location so as to present a logic level "high" (e.g., 3.3V) or a logic level "low" (0V) at each solder bump 115 on which identification code digits are to be provided.

In one embodiment of the present invention, integrated circuit die 110 has constructed thereon a primary function circuit 112 for performing the predetermined electrical function in the extended circuit in which it is installed and an identification code transferral circuit 114 for selectively coupling the identification storage means 130 and the primary function circuit 112 to the output port of SIDIC 100. Identification transferral circuit 114 is controlled by output port selection line 132 in the manner discussed above. The solder bumps 115 that are electrically coupled to the identification storage means 130 are electrically coupled to identification transferral circuit 114 which isolates primary function circuit 112 from the first voltage bus 134 and second voltage bus 136 as well as providing means to couple the identification storage means to the output port as determined by the state of output port selection line 132.

Figure 4:
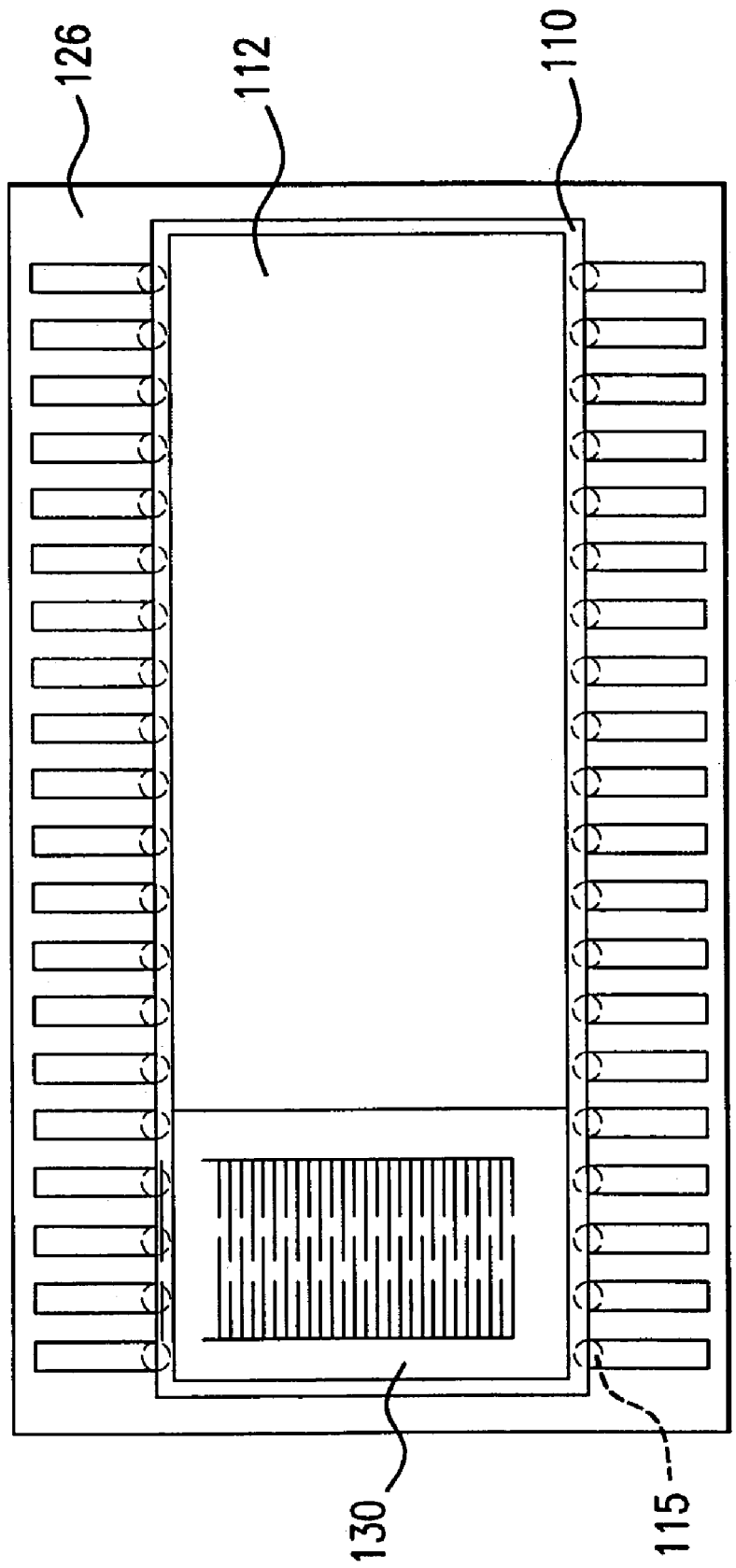
FIG. 4 is an illustration depicting the physical layout of another embodiment of the present invention.

An alternative embodiment of the self-identifying integrated circuit of the present invention is illustrated in FIG. 4. As is shown, integrated circuit die 110 has constructed thereon primary function circuit 112 and identification storage means 130. This configuration allows the integrated circuit manufacturer to provide each individual circuit die with a unique identification code, independent of the package substrate. In this embodiment, identification storage means 130 would include the necessary circuitry, e.g., identification transferral circuit, to provide the identification code at the output port.

Figure 5A:
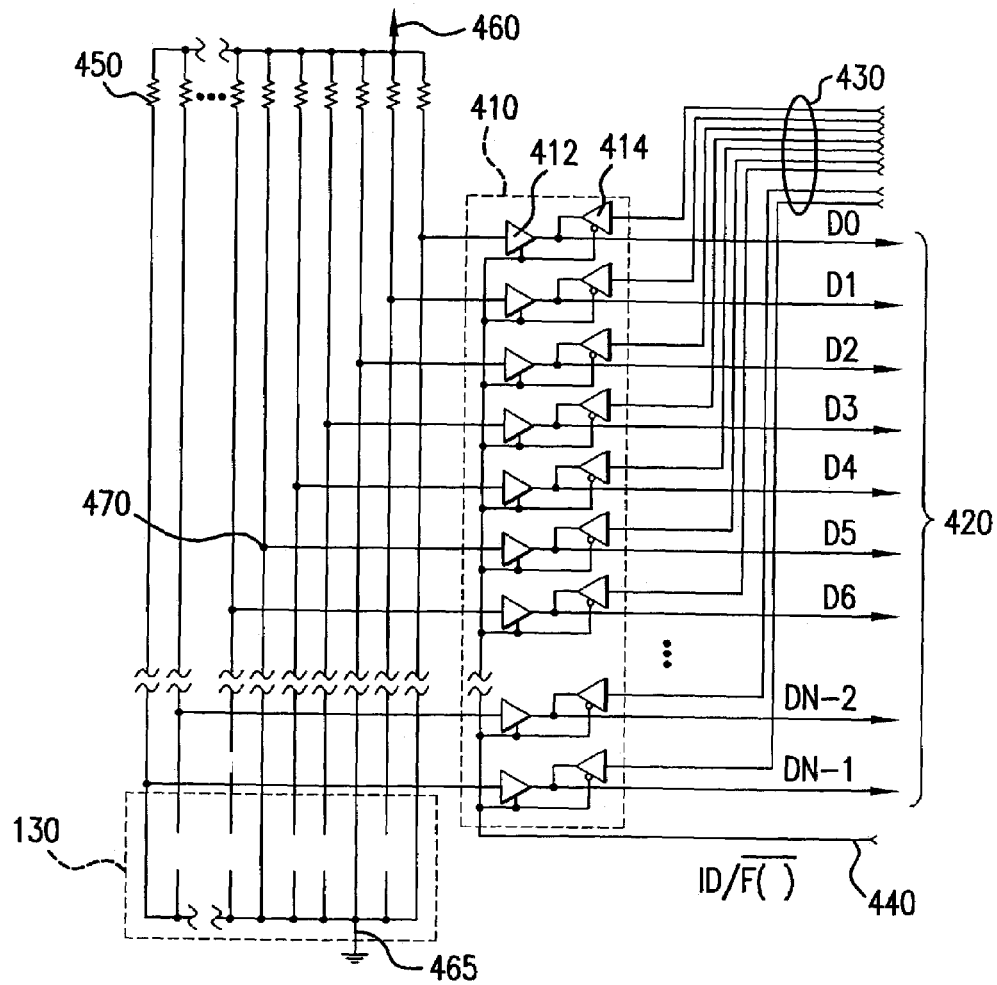
FIG. 5A is a schematic diagram of a voltage tap network as used in a preferred embodiment of the present invention.

FIG. 5A schematically diagrams an exemplary circuit for realizing an N bit self-identifying integrated circuit of the present invention. As is shown, identification storage means 130 is an N bit voltage tap network comprising a first voltage bus 460 (e.g., 3.3V), a second voltage bus 465 (e.g., ground), N pull-up resistors 450, and N voltage taps 470. To encode the unique identification code, identification storage means 130 has formed therein a plurality of gaps, each of which result in a "high" logic level at the corresponding voltage tap 470. Conversely, the absence of a gap in identification storage means 130 ties a corresponding voltage tap 470 to ground, thereby storing a "low" logic level for that digit.

The N voltage taps 470 are electrically coupled to identification transferral circuit 410 which consists of N bus buffer pairs. Each of the bus buffer pairs consists of a uni-directional identification code bus buffer 412 and a bi-directional primary function bus buffer 414. The uni-directional identification code bus buffers 412 are placed in their low impedance operational state when a "high" signal is placed on a control port thereof and bi-directional primary function bus buffer 414 is placed in a low impedance operational state when a "low" signal is placed on its control terminal. By this arrangement, a "high" signal placed on output port selection line 440 causes the identification storage means 130 to be coupled to output port 420 and a logic level "low" signal on output port selection line 440 causes the primary function circuit taps 430 of the primary function circuit to be electrically coupled to the output port 420. It should be noted that whereas standard bus buffers are illustrated in FIG. 5A as the identification transferral circuit components, any switching circuit capable of selectively coupling the primary function circuit and the identification storage means to the output port falls within the scope of the present invention.

Figure 5B:
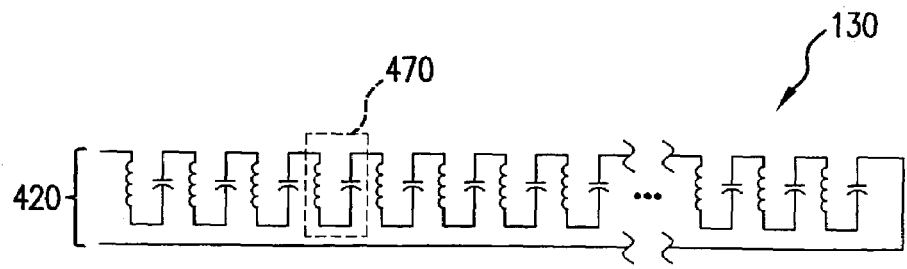
FIG. 5B is a schematic diagram of a resonant circuit structure as used in a preferred embodiment of the present invention.
Figure 6:
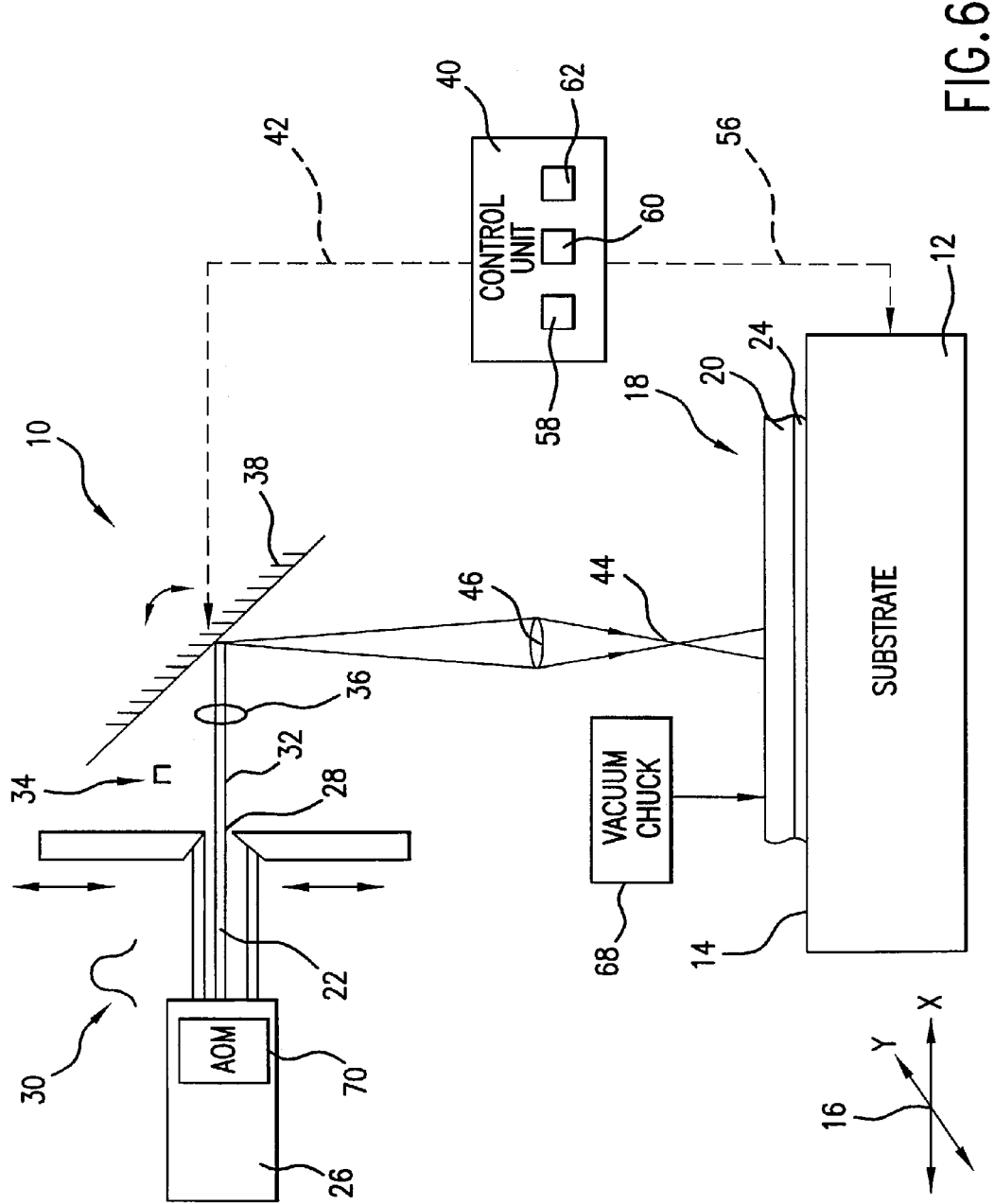
FIG. 6 is a block diagram illustrating an apparatus for the direct-write forward transfer of material as utilized by the method of the present invention.

The self-identifying integrated circuit of the present invention is not limited to the utilization of unique identifying codes in the form of numbers stored as a set of discrete voltage levels. The identification code may also be stored in a circuit as a response to an excitation signal. For example, the unique identification code may be stored as a precision resistance value in a precision resistor and is measured by a drop in an applied voltage. A further example is an RC circuit in which the unique identification code is held in the decay time of an applied step voltage. A further example is where the unique identification code is a resonant frequency response of a resonant circuit such as shown in FIG. 5B. As is shown, identification storage means 130 is composed of a plurality of resonant elements 470 connected in series. Each resonant element 470 may consist of an inductor and a capacitor such that when a large number of such are series connected, a large number of distinguishable frequency bands within a specified range may be realized thus providing a large number of unique, independent resonant frequencies to represent identification codes.

An advantage of identification storage means 130 having the form of FIG. 5B, i.e., the unique identification code being a response to an excitation signal, is that a fewer number of output pins are occupied as output port pins. As is shown in FIG. 5B, output port 420 requires only two pins whereas in the configuration of FIG. 5A, output port 420 comprises N pins. A further advantage of the configuration of FIG. 5B is that an identification transferral circuit and associated output port selection circuitry is not required. If the band of frequencies representing the entire set of identification codes is chosen to be in a high frequency band, the primary function circuit may be isolated in frequency and buffering of output port 420 would therefore not be necessary.

The schematic diagram of FIG. 5A illustrates the implementation of an N bit code for SIDIC 100. To allow every self-identifying integrated circuit to have its own unique identification code, the number N must be very large. By way of example, when N is 32, only about four billion unique codes are available, whereas when N=64, over 18 quintillion unique codes are possible. In most sophisticated integrated circuits, there are sufficient number of package pins which can be configured in the above-described output port configuration so as to allow a large number of unique identification codes.

A more prohibitive aspect of the self-identifying integrated circuit of the present invention is in the size of identification storage means 130 capable of immutably storing a large digital number. Thus, it becomes necessary to construct the identification storage means 130 on an essentially microscopic scale. In a preferred embodiment of the present invention, the disposition of identification storage means 130 is accomplished by direct-write laser forward transfer of material.

Referring to FIGS. 6 and 7A–7D, the direct-write laser forward transfer process (also referred to as the contact transfer process) system 10 is illustrated. A substrate 12 (e.g., package substrate 126 or circuit die substrate 110) on the surface 14 of which a microstructure pattern (e.g., voltage tap network or resonant circuit components) is to be created is positioned onto a translational stage (not shown) capable of moving in X-Y directions 16. A material covered ribbon 18 is placed on the top of the substrate 12 in contiguous contact with the surface 14 thereof. The material covered ribbon 18 includes a flexible transparent support 20 which is transparent to the laser beam 22 and a material layer 24 that has been deposited onto the transparent support 20. The material layer 24 includes the material which is to be deposited onto the surface 14 of the substrate 12 to form the identification storage means 130. The material covered ribbon 18 is held in place on substrate surface 14 by vacuum chuck 68.

Laser 26, for example, a frequency tripled Nd laser, solid-state diode pumped laser, etc. emits a laser beam 22 of known characteristics. The generated laser beam 22 passes through the aperture 28 which spatially filters the laser beam so as to cut off a peripheral portion of the flux of the laser beam 22 and further shapes the cross-section of the laser beam to the geometry of the microstructure to be created, typically round or rectangular.

A "top-hat" uniform intensity profile achieves the best line uniformity and sharpest edges where the beam shape is generally circular or rectangular. A circularly shaped beam is generally preferred if all line segments to be deposited are not orthogonal. Particularly, as known to those skilled in the art, the laser beam 22 exiting the laser 26 has an intensity distribution across the diameter of the cross-section thereof as depicted by element 30 of FIG. 6. As shown, the intensity of the flux of the laser beam is maximized in the center and lower at portions around the peripheral edges thereof. Thus, the aperture 28 cuts off the peripheral portions of lower intensity of the laser beam 22, maintaining the portion 32 thereof having a substantially uniform cross-sectional distribution of intensity, as shown by element 34 of FIG. 6.

The structured laser beam, having a uniform distribution of intensity, is directed towards a lens 36 (optional), or alternatively, is directed to a mirror 38 which is controlled by a control unit 40 over a control channel 42 which alters the position of the mirror 38 in order to control the direction of the laser beam portion 44 relative to the material covered ribbon 18 and the substrate 12.

The laser beam portion 44 reflected from the mirror 38 passes through the lens 46 for advantageous focusing thereof and impinges upon the material covered ribbon 18 in a predetermined area. Since the support 20 is transparent to the laser radiation, the laser beam portion 44 passes through the transparent support 20 (also referred to herein as a backing) and impinges upon the material layer 24 and conveys thereto energy which evaporates a portion of the material layer 24 from the area 48 as best shown in FIGS. 7A and 7B. The material transfers work optimally when the laser pulse is strongly absorbed in a shallow region at the interface between the ribbon backing material 20 (e.g., transparent polyester) and the material 24. The laser beam vaporizes a small amount of the material at the interface causing it to be released from the backing 20 and to be driven forward in a mildly percussive event.

Typically, the portion 50 of the material deposited onto the substrate 12 in a single laser "shot" does not complete an operation of creating the full microstructure 52 (shown in FIG. 7B in invisible lines). Therefore, to continue formation of the microstructure 52, the process is continued, as shown in FIG. 7C, wherein the laser beam is displaced to perform transfer from a "fresh" area 54 located adjacent to or partially overlapping with the portion 50. Thus, the material is released from the ribbon by means of adjacent or partially overlapping laser pulses. The entire pattern is written by scanning the beam, or the substrate, or both, in a coordinated pattern.

If more material is required than can be transferred in a single scan (called a "pass"), after the original ribbon is removed, a fresh ribbon is applied and the process is repeated. This sequential multiple-ribbon stacking technique is used for transfers to ensure enough material is deposited and that holes, undesired gaps, and defects arising in the first pass are "averaged out". Further, regions of different material composition and conductivity may be applied. Thus, for impingement onto the non-transferred area 54 of the material covered ribbon 18, the laser beam 44 is displaced from its original position by means of the mirror 38 controlled by the control unit 40.

As will be discussed in paragraphs below, the control unit 40 may include a computer workstation, which has embedded therein typical design programming product common in the art, which includes a database (data 58) containing coordinates of the structures to be created to form a particular identification storage topology and software 62 which "reads" the position of the structure to be created from the data 58, and, responsive thereto, controls mutual disposition between the elements of the technological process. Particularly, with regard to the material transfer technique, the software 62 controls the mechanism 60 which displaces either the mirror 38, or the substrate 12, or both simultaneously in a manner to align the laser beam 44 to the coordinates of the structure to be created on the substrate 12.

The location of the laser beam 44 is positioned in the manner described above until it is aligned with the coordinates XY of the structure to be created on the substrate 12. Before actuating the laser, care is also taken to align a fresh ribbon with the area of the substrate on which the pattern is to be created, so that the laser beam 44, which is aligned with the coordinates XY, impinges upon a fresh ribbon for material transfer. For multiple sequential material transfers, the mechanism 60 displaces the mirror 38 after each "shot", thus causing a responsive displacement of the laser beam 44. This process is repeated until the entire structure is formed.

In order to control the positioning of the substrate 12, the mechanism 60, which is operatively coupled to the stage on which the substrate 12 is positioned, displaces the stage in X-Y directions to align the subject area of the substrate (obtained from the data 58) with the position of the laser beam 44. In simultaneous independent displacement of the laser beam 44 and the substrate 12 (i.e., executing a relative motion of one with respect to the other), the mechanism 60 is coupled to both the mirror 38 and the substrate 12.

As best shown in FIG. 7D, after the portion 64 of the material layer 24 has been deposited onto the surface 14 of the substrate 12 in adjacent or partially overlapping fashion with the portion 50 of the microstructure 52, the laser beam 44 is displaced to the next (adjacent or overlapping) position to complete formation of the microstructure 52. As is seen in FIG. 7D, no edge irregularities occur between the portions 50 and 64 of the microstructure 52 due to sequential material transfers. In this manner, the contact transfer process of the present invention continues until the complete microstructure 52 is formed on the surface 14 of the substrate 12. It is found that multiple sequential material transfers (each of which includes alignment of the unablated material layer 24 with the area on the surface of the substrate, setting the relative disposition between the laser beam and the substrate, and the laser "shot") may be required for forming a microstructure 52 of sufficient thickness or density.

The direct-write laser forward transfer of material technique may be used to construct identification storage means in the form of a voltage tap network as well as in the form of an excitation responsive circuit. As previously stated, the direct-write laser forward transfer of material technique may be used to deposit different compositions and thereby may be used to form different circuit elements such as precision resistors. Furthermore, the method is precisely controlled so as to form components of near exact capacitance or inductance.

The direct-write laser forward transfer of material technique is a flexible method in the deposition of micro-fine structures such as the voltage tap network of the identification storage means 130 in that the order of operations may be modified to suit a particular application. For example, a generic conductor network, i.e., a conductor network in which the gaps determining the unique identification code have not been written, is first deposited and the gaps may be subsequently formed at the appropriate positions to construct a voltage tap network. Alternatively, individual conductor segments may be deposited by direct-write forward transfer of material to form the voltage tap network in the prescribed manner resulting in a unique identification code. Obviously, the identification storage means 130 need not be formed by direct-write laser forward transfer material, but may be formed by other means capable of forming the identification storage means 130 on a substrate at the scale necessary to limit the size thereof.

Figure 8:
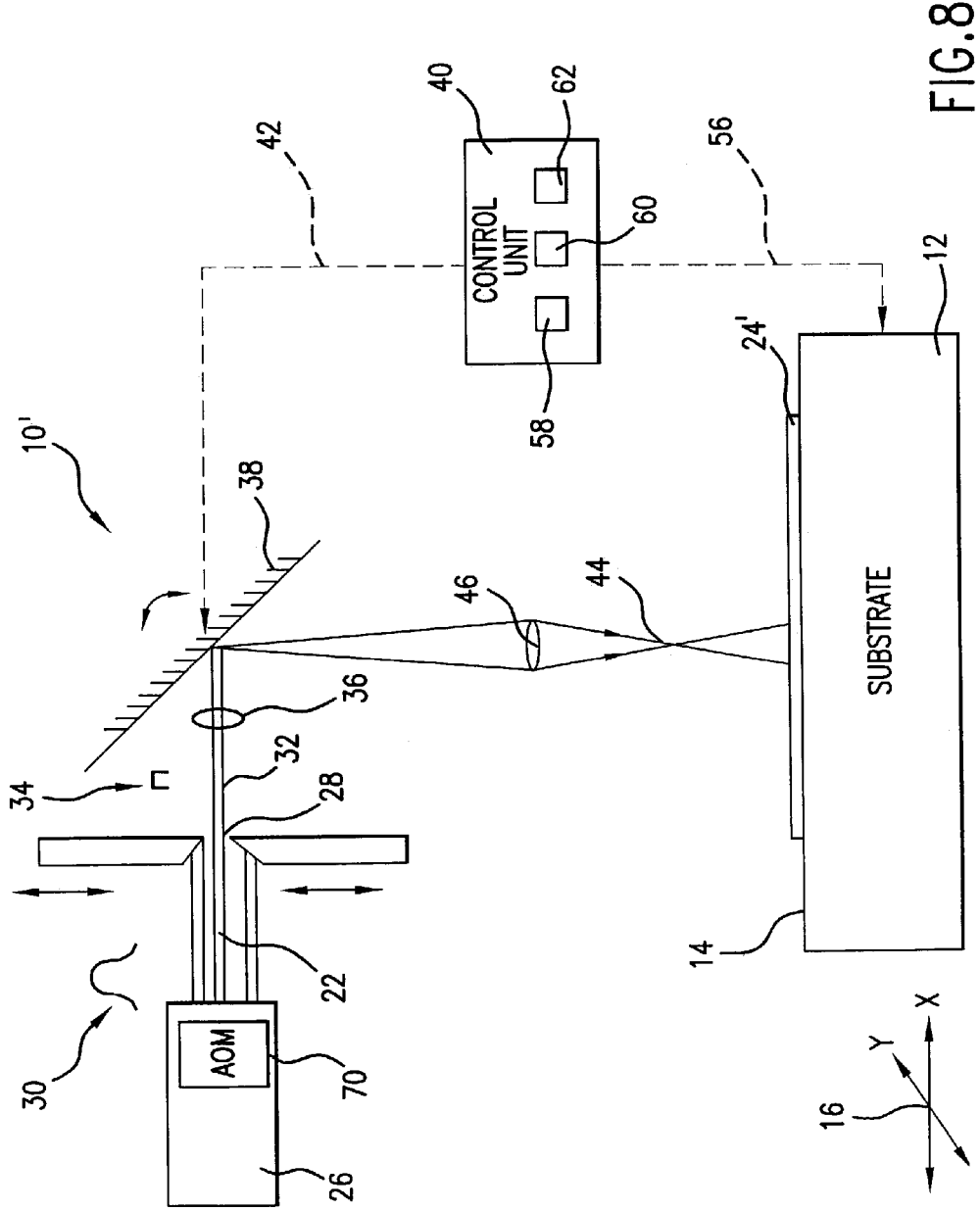
FIG. 8 is a block diagram illustrating an apparatus for laser ablation of select material as utilized by the method of the present invention.

The diagram of FIG. 8 illustrates the laser ablation of select material process 10', where like numbered elements of the direct-write laser forward transfer process system 10 of FIGS. 6 and 7A–7D perform the same function described hereinabove for the laser ablation of select material process system 10'. Surface 14 of substrate 12 has disposed thereon a generic conductor pattern 24'. Generic conductor pattern 24' may be a standard pattern which is indistinguishable from one pre-patterned substrate to another. The directed laser beam portion 44 impinges on a portion of generic conductor web 24' for which the ablation of material is desired. Selected portions of generic conductor pattern 24' are removed until a unique conductor network is formed. The unique conductor network may be the voltage tap network described hereinabove. Alternatively, the ablated portions of generic conductor network 24' may be subsequently filled with a material of a specified conductivity to form the excitation responsive circuit described hereinabove.

Although the direct-write laser forward transfer of material process system 10 and laser ablation of select material process system 10' have been described herein as separate apparatuses, it is, of course, within the scope of the present invention to combine both systems in a single apparatus to produce the identification storage means 130 of the present invention by either or both processes.

Figure 9:
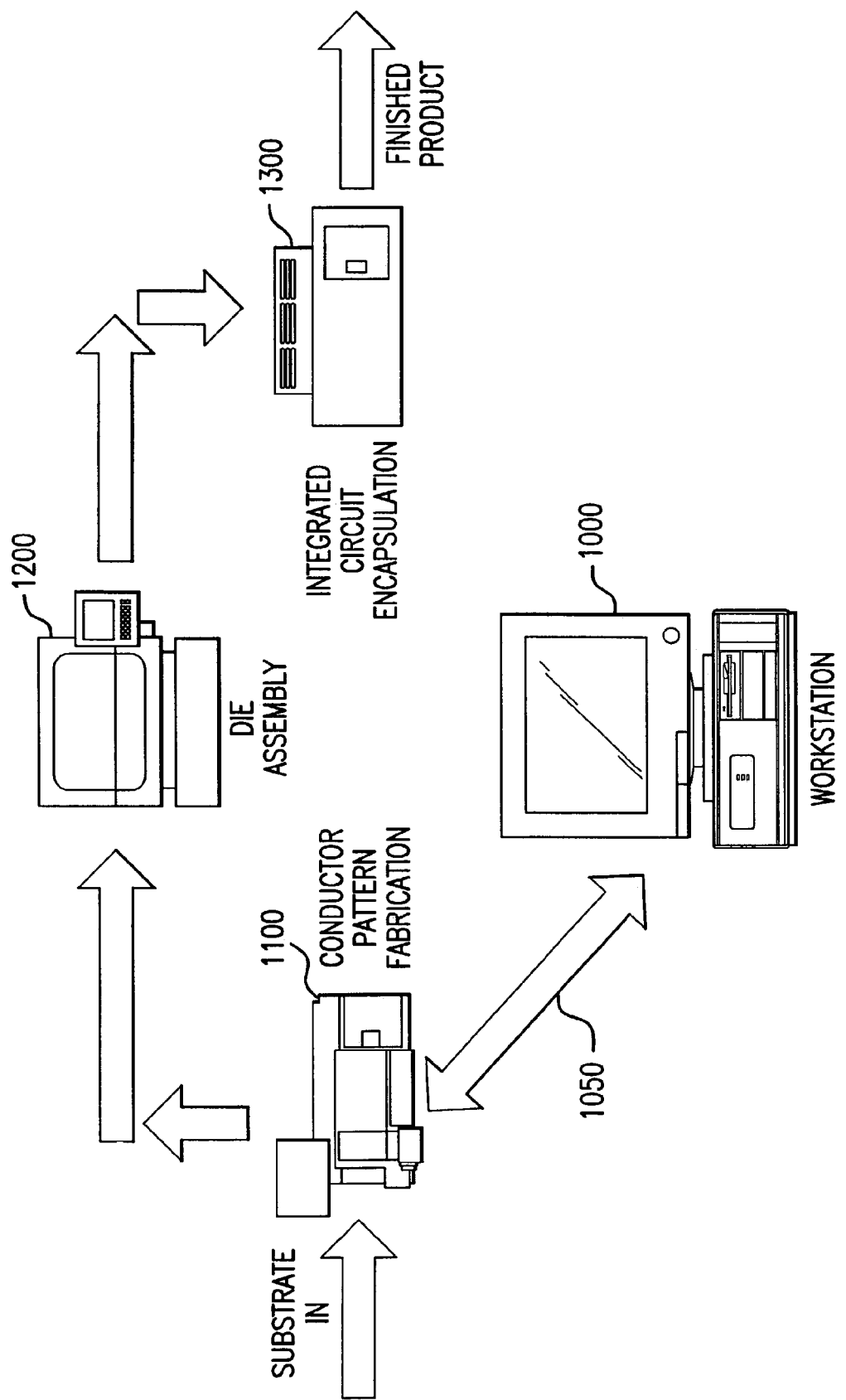
FIG. 9 is a block diagram illustrating the steps in fabricating self-identifying integrated circuits of the present invention.

Referring to FIG. 9, the method of fabricating the self-identifying integrated circuit of the present invention is illustrated by way of a systems diagram. Controlling the various systems components and the processing steps thereof is workstation 1000. As indicated hereinabove, workstation 1000 is a computer containing the various databases 58 of various microstructure patterns, containing a database of available identification code numbers, and executing software for controlling the process steps for constructing SIDIC 100.

As is shown in the Figure, workstation 1000 is electrically coupled to conductor pattern fabrication unit 1100 by control bus 1050. Conductor pattern fabrication unit 1100, in a preferred embodiment, is a direct-write laser forward transfer of material capable apparatus described in conjunction with FIGS. 6 and 7A–7D or the laser ablation apparatus of FIG. 8 and control line 1050 is electrically coupled to control unit 40 thereof.

As shown in FIG. 9, a blank substrate is introduced into conductor pattern fabrication unit 1100. The substrate may be package substrate 126 of encasement means 120 or may be an integrated circuit die substrate having a designated portion thereof dedicated to receiving identification storage means 130.

An available unique identification code is selected by workstation 1000 and is transferred to control unit 40 of conductor pattern fabrication unit 1100 by control line 1050. Conductor pattern fabrication unit 1100 constructs identification storage means 130 onto the substrate. Conductor pattern fabrication unit 1100 is properly configured to form either a voltage tap network or an interrogation response circuit as the identification storage means at the time of SIDIC fabrication.

When the substrate has been disposed with an identification storage means containing an immutable unique identification code, the substrate is presented to die assembly unit 1200. Die assembly unit 1200 attaches the integrated circuit die 110 to package substrate 126 by known methods (e.g., wire bonding or solder flow). At the output of die assembly unit 1200, an integrated circuit die will be electrically coupled to a package substrate and will include an appropriately connected identification storage means either on the integrated circuit die substrate 110 or on the package substrate 126. Furthermore, the integrated circuit die 110, identification storage means 130, and identification transferral circuit 114 will be electrically coupled to the appropriate electrodes (e.g., solder balls) exterior to the integrated circuit package.

From the die assembly process, the encoded substrate/integrated circuit sub-assembly is transferred to an integrated circuit encapsulation unit 1300 where the identification storage means 130 and integrated circuit die 110 are permanently encapsulated to form the finished SIDIC 100.

Although the invention has been described herein in conjunction with specific embodiments thereof, many alternatives, modifications, and variations will be apparent to those skilled in the art. The present invention is intended to embrace all such alternatives, modifications, and variations that fall within the spirit and broad scope of the appended Claims.

What is claimed is:

1. A self-identifying integrated circuit for performing a predetermined electrical function in an external electric circuit via a plurality of electrodes electrically coupled thereto, the self-identifying integrated circuit further providing a unique identification code to the external electric circuit, the predetermined electrical function being exclusive of providing the unique identification code to the external electric circuit, the self-identifying integrated circuit comprising:

identification storage means for immutably storing the unique identification code;

a primary function circuit for performing the predetermined electrical function in the external electric circuit, said primary function circuit being fabricated on a circuit die electrically coupled to the plurality of electrodes;

an output port including at least one electrode, said output port electrically coupled to said identification storage means for conveying the unique identification code to the external circuit; and encasement means for permanently enclosing said primary function circuit and said identification storage means therein, the plurality of electrodes coupled to said primary function circuit, said at least one electrode of said output port extending through said encasement means, wherein said encasement means includes a package substrate and an encapsulant, wherein said identification storage means is disposed on said package substrate, and wherein said identification storage means includes a voltage tap network, the unique identification code being stored as a set of discrete voltage levels in said voltage tap network.

2. The self-identifying integrated circuit as recited in claim 1, wherein the plurality of electrodes coupled to said primary function circuit includes said at least one electrode of said output port.

3. The self-identifying integrated circuit as recited in claim 2, further comprising an identification transferal means for selectively coupling said voltage tap network and the primary function circuit to the output port.

4. The self-identifying integrated circuit as recited in claim 3, wherein said voltage tap network is fabricated by direct-write laser forward transfer of material.

5. The self-identifying integrated circuit as recited in claim 3, wherein said voltage tap network is fabricated by laser ablation of select material.

6. A self-identifying integrated circuit for performing a predetermined electrical function in an external electric circuit via a plurality of electrodes electrically coupled thereto, the self-identifying integrated circuit further providing a unique identification code to the external electric circuit, the predetermined electrical function being exclusive of providing the unique identification code to the external electric circuit, the self-identifying integrated circuit comprising:

identification storage means for immutably storing the unique identification code;

a primary function circuit for performing the predetermined electrical function in the external electric circuit, said primary function circuit being fabricated on a circuit die electrically coupled to the plurality of electrodes;

an output port including at least one electrode, said output port electrically coupled to said identification storage means for conveying the unique identification code to the external circuit; and encasement means for permanently enclosing said primary function circuit and said identification storage means therein, the plurality of electrodes coupled to aid primary function circuit, said at least one electrode of said output port extending through said encasement means, wherein said identification storage means includes an identification circuit for providing the unique identification code upon excitation by an interrogation signal, the unique identification code being a predetermined response signal to said interrogation signal.

7. The self-identifying integrated circuit as recited in claim 6, wherein said identification circuit is a resonant electric circuit providing a response signal of one of a maximum value and a minimum value at a predetermined interrogation frequency.

8. The self-identifying integrated circuit as recited in claim 6, wherein said identification circuit is a time-constant circuit providing a decaying signal of predetermined duration in response to a pulsed interrogation signal.

9. The self-identifying integrated circuit as recited in claim 6, wherein said identification circuit is a resistive circuit of a predetermined resistance value.

10. The self-identifying integrated circuit as recited in claim 6, wherein said identification circuit is fabricated by direct-write laser forward transfer of material.

11. The self-identifying integrated circuit as recited in claim 6, wherein said identification circuit is fabricated by laser ablation of select material.

12. A self-identifying integrated circuit for performing a predetermined electrical function in an external electric circuit via a plurality of electrodes electrically coupled thereto, the self-identifying integrated circuit further providing a unique identification code to the external electric circuit, the predetermined electrical function being exclusive of providing the unique identification code to the external electric circuit, the self-identifying integrated circuit comprising:

identification storage means for immutably storing the unique identification code;

a primary function circuit for performing the predetermined electrical function in the external electric circuit, said primary function circuit being fabricated on a circuit die electrically coupled to the plurality of electrodes;

an output port including at least one electrode, said output port electrically coupled to said identification storage means for conveying the unique identification code to the external circuit; and encasement means for permanently enclosing said primary function circuit and said identification storage means therein, the plurality of electrodes coupled to said primary function circuit, said at least one electrode of said output port extending through said encasement means, wherein said identification storage means is disposed on a circuit die containing the primary function circuit, and wherein said identification storage means is fabricated by direct-write laser forward transfer of material.

13. The self-identifying integrated circuit as recited in claim 12, wherein said identification storage means is fabricated by direct-write forward transfer of material.

14. A method of fabricating self-identifying integrated circuits, the method comprising the steps of:

(a) selecting a unique identification code for one of the self-identifying circuits;

(b) fabricating a unique conductor network on a first substrate section for immutably storing said unique identification code;

(c) coupling an electric circuit disposed on a second substrate section to said conductor patterns;

(d) coupling a plurality of electrodes to aid electric circuit;

(e) coupling at least one electrode to said conductor network; and (f) encapsulating said conductor network and said electrical circuit in encasement means such that said plurality of electrodes coupled to said electric circuit and said at least one electrode coupled to said conductor network protrude through at least one surface thereof, wherein said encasement means includes a package substrate and an encapsulant, said encapsulating step including the step of applying said encapsulant to surround said conductor network and said electric circuit, and wherein said first substrate section is said package substrate and said second substrate section is an integrated circuit die.

15. The method of manufacturing self-identifying integrated circuits as recited in claim 14, wherein said first substrate section and said second substrate section are integrated as a single integrated circuit die.

16. The method of manufacturing self-identifying integrated circuits as recited in claim 14, wherein said conductor network fabrication step includes the process of direct-write laser forward transfer of material, said material being either electrically conductive or treatable to become electrically conductive.

17. A method of manufacturing self-identifying integrated circuits, the method comprising the steps of:

(a) selecting unique identification code for one of the self-identifying circuits;

(b) fabricating a unique conductor network on a first substrate section for immutably storing said unique identification code;

(c) coupling an electric circuit disposed on a second substrate section to said conductor patterns;

(d) coupling a plurality of electrodes to aid electric circuit;

(e) coupling at least one electrode to said conductor network; and (f) encapsulating said conductor network and said electrical circuit in encasement means such that said plurality of electrodes coupled to said electric circuit and said at least one electrode coupled to said conductor network protrude through at least one surface thereof, wherein said unique conductor network fabrication step further includes the steps of:

(1) constructing a generic conductor pattern on said substrate;

(2) forming at least one gap in said generic conductor pattern to provide said unique conductor network.

18. The method of manufacturing self-identifying integrated circuits as recited in claim 17, whereby said at least one gap is formed by laser ablation of select material.

19. The method of manufacturing self-identifying integrated circuits as recited in claim 17, wherein said conductor network fabrication step includes the step of:

(3) filling at least one of said at least one gap with a conductive material or with a material subsequently made conductive.

20. The method of manufacturing self-identifying integrated circuits as recited in claim 19, wherein said conductive material and said material made conductive have a different conductivity than said conductor web.

* * * * *